United States Patent
Liu et al.

(10) Patent No.: US 7,522,832 B2
(45) Date of Patent: Apr. 21, 2009

(54) APPARATUS AND METHOD FOR STROBE CHARGING

(75) Inventors: Shi Chen Liu, Hsinchu (TW); Chien Kuo Hsu, Hsinchu (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 472 days.

(21) Appl. No.: 11/365,778

(22) Filed: Feb. 28, 2006

(65) Prior Publication Data

US 2007/0201855 A1     Aug. 30, 2007

(51) Int. Cl.
| | |
|---|---|
| G03B 7/26 | (2006.01) |
| G03B 7/24 | (2006.01) |
| H05B 37/00 | (2006.01) |
| H05B 39/00 | (2006.01) |
| H05B 41/14 | (2006.01) |
| H04N 5/222 | (2006.01) |
| H04N 5/225 | (2006.01) |

(52) U.S. Cl. ................... 396/206; 396/303; 315/241 R; 315/241 P; 348/371; 348/372; 348/333.13

(58) Field of Classification Search ................. 396/205, 396/206, 303; 315/241 R, 241 P; 348/371, 348/372, 333.13
See application file for complete search history.

(56) References Cited

U.S. PATENT DOCUMENTS 6,393,220 B1 *    5/2002    Nose et al. .................. 396/205

\* cited by examiner

*Primary Examiner*—Melissa J Koval

(57) ABSTRACT

An apparatus and method for strobe charging is disclosed. The apparatus and method can dynamically adjust a charging current according to current power level of a battery, thereby stabilizing the operating voltage of the battery and thus using the battery power to the full. The apparatus and method employs a control circuit to detect the current power level of the battery, and dynamically adjusts the charging current, generated from the battery, according to the detected current power level.

9 Claims, 3 Drawing Sheets

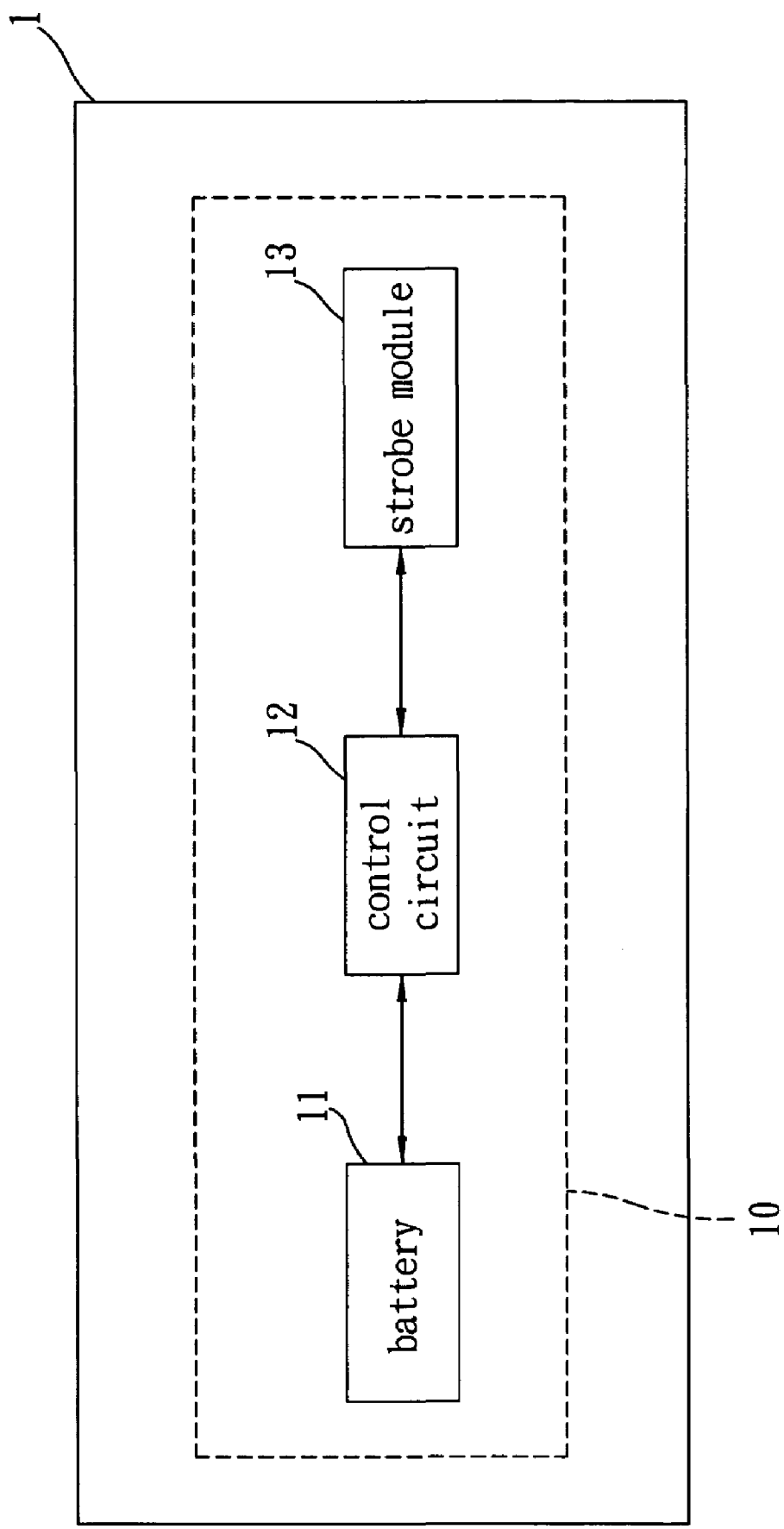
F I G. 1

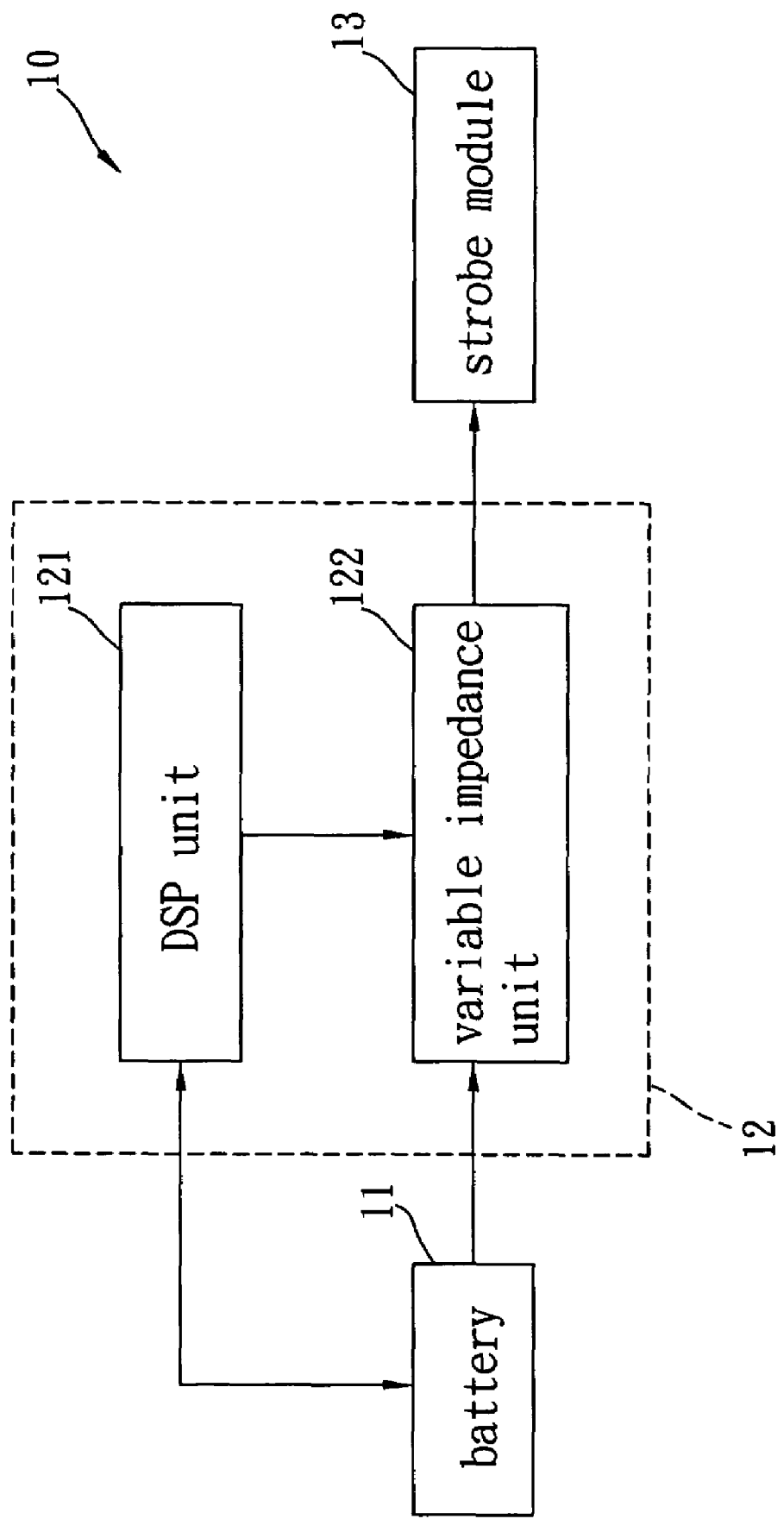
F I G. 2

APPARATUS AND METHOD FOR STROBE CHARGING

BACKGROUND OF INVENTION

1. Field of the Invention

The present invention relates in general to strobe charging, and more particularly to an apparatus and method for strobe charging which can dynamically adjusts a charging current according to current power level of a battery.

2. Description of the Prior Art

In a still image capture system, such as a camera, a strobe is commonly used to provide sufficient light source for image capturing. The strobe needs charging each time before use, and it is typical to employ a power supply unit (e.g. a battery) for providing a charging current to the strobe.

In prior arts, a constant charging current is used. However, if the battery is kept at providing the constant charging current, the operating voltage of the battery will lower rapidly following the power level decrease of the battery. This effect will become more serious when the battery power level is low. When the operating voltage lowers to a certain value, the battery cannot provide electric power any more, even though there is surplus power in the battery. This will cause the inefficiency and waste of the battery power.

SUMMARY OF INVENTION

In view of this, an object of the present invention is to provide an apparatus and method for strobe charging which can stabilize the operating voltage of the battery in the process of strobe charging, and thus use the battery power to the full, thereby extending the battery life.

According to one embodiment of this invention, a strobe charging apparatus is provided. The strobe charging apparatus comprises: a power supply unit for generating a charging current; a control circuit for detecting a current power level of the power supply unit, and dynamically adjusting the charging current according to the current power level; and a strobe module charged by the charging current.

According to another embodiment of this invention, a strobe charging method is provided. The strobe charging method comprises the steps of: generating a charging current for charging a strobe module by a power supply unit; detecting a current power level of the power supply unit; and dynamically adjusting the charging current according to the current power level.

BRIEF DESCRIPTION OF THE DRAWINGS

FIG. 1 is a block diagram of a preferred embodiment of the strobe charging apparatus according to the present invention.

FIG. 2 is a more detailed block diagram of the strobe charging apparatus of FIG. 1.

DETAILED DESCRIPTION

Figure 3:
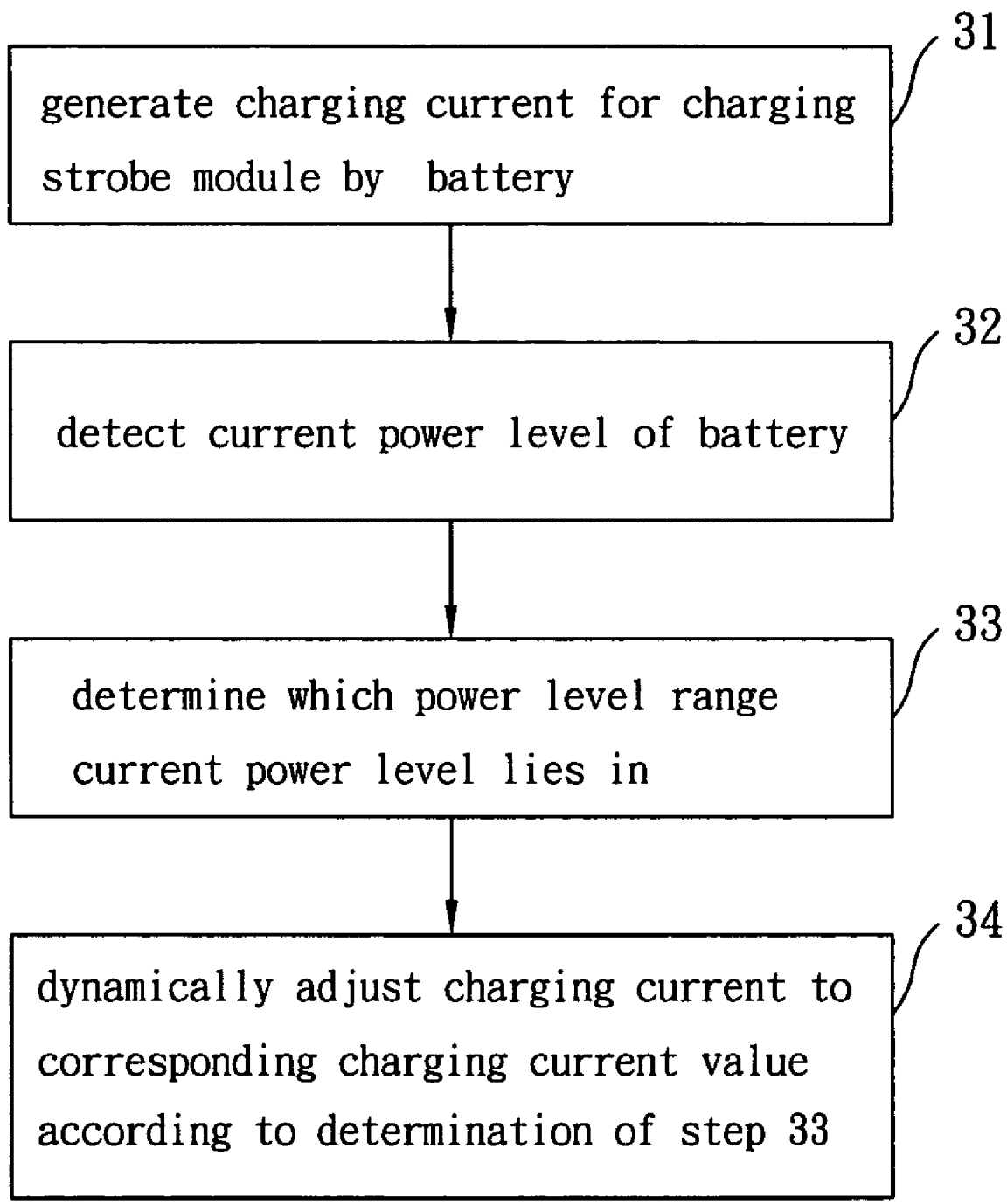
FIG. 3 is a flow chart of a preferred embodiment of the strobe charging method according to the present invention.

FIG. 1 is a block diagram of a preferred embodiment of the strobe charging apparatus according to the present invention. As shown in FIG. 1, the strobe charging apparatus 10 is built in a camera 1, and comprises a battery 11, a control circuit 12, and a strobe module 13. The battery 11 generates a charging current for charging the strobe module 13. The battery 11 has a plurality of power level ranges, each of which is corresponding to a charging current value. In one embodiment, a lower power level range is corresponding to a smaller charging current value. In this manner, when the power level of the battery 11 lowers, a smaller charging current is generated so as to keep the operating voltage of the battery 11 stable and use the battery power to the full.

The control circuit 12 is coupled to the battery 11, and detects the current power level of the battery 11. The control circuit 12 determines which power level range the current power level lies in, and dynamically adjusts the charging current to the corresponding charging current value. The adjusted charging current is then used to charge the strobe module 13.

FIG. 2 is a more detailed block diagram of the strobe charging apparatus 10 of FIG. 1. As shown in FIG. 2, the control circuit 12 includes a digital signal processing (DSP) unit 121 and a variable impedance unit 122. The DSP unit 121 detects the current power level of the battery 11, and generates a control signal accordingly. The variable impedance unit 122 transmits the charging current from the battery 11 to the strobe module 13. The impedance of the variable impedance unit 122 is adjusted according to the control signal provided by the DSP unit 121. In one embodiment, the DSP unit 121 detects the current power level and generates the control signal by executing, a firmware program. In another embodiment, the variable impedance unit 122 includes a circuit composed of resistors and switches. The impedance of the variable impedance unit 122 is then adjusted by changing ON/OFF states of the switches according to the control signal.

FIG. 3 is a flow chart of a preferred embodiment of the strobe charging method according to the present invention. The preferred embodiment is applied to the strobe charging apparatus 10 of FIG. 1. As shown in FIG. 3, the flow comprises the steps of:

31 generating the charging current for charging the strobe module 13 by the battery 11;

32 detecting the current power level of the battery 11;

33 determining which power level range the current power level lies in; and 34 dynamically adjusting the charging current to the corresponding charging current value according to the determination of step 33.

By means of the embodiments described above, the strobe charging apparatus and method of the present invention can dynamically adjust a charging current from a battery to a proper value according to the current power level of the battery. Thus, the user can keep the operating voltage of the battery stable in the process of strobe charging, thereby utilizing the battery power to the full and extending the battery life.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A strobe charging apparatus comprising:
a power supply unit for generating a charging current;
a control circuit for detecting a current power level of the power supply unit, and dynamically adjusting the charging current according to the current power level;
a strobe module charged by the charging current; and
wherein the control circuit comprises:

a digital signal processing (DSP) unit for detecting the current power level of the power supply unit and generating a control signal accordingly; and a variable impedance unit coupled between the power supply unit and the strobe module, wherein an impedance of the variable impedance unit is adjusted according to the control signal.

2. The strobe charging apparatus of claim 1, wherein the power supply unit is a battery.

3. The strobe charging apparatus of claim 1, wherein the power supply unit comprises a plurality of power level ranges, each of which is corresponding to a charging current value.

4. The strobe charging apparatus of claim 3, wherein if the control circuit detects that the current power level lies in one of the power level ranges, the control circuit adjusts the charging current to the corresponding charging current value.

5. The strobe charging apparatus of claim 3, wherein a lower one of the power level ranges is corresponding to a smaller charging current value.

6. The strobe charging apparatus of claim 1, wherein the strobe charging apparatus lies within a still image capture system.

7. The strobe charging apparatus of claim 6, wherein the still image capture system is a camera.

8. The strobe charging apparatus of claim 1, wherein the DSP unit detects the current power level and generates the control signal by executing a firmware program.

9. The strobe charging apparatus of claim 1, wherein the variable impedance unit comprises a circuit composed of resistors and switches, wherein the impedance of the variable impedance unit is adjusted by changing ON/OFF states of the switches according to the control signal.

* * * * *